United States Patent
Meyer et al.

(10) Patent No.: US 8,008,608 B2
(45) Date of Patent: Aug. 30, 2011

(54) MICROWAVE AUTOCLAVE

(75) Inventors: Matthias Meyer, Braunschweig (DE); Burkhard Binder, Gottingen (DE); Martin Graeber, Coesfeld (DE)

(73) Assignees: Deutsches Zentrum fur Luft- und Raumfahrt E.V. (DRL E.V.), Cologne (DE); Maschinenbau Scholz GmbH & Co. KG, Coesfeld (DE)

( * ) Notice: Subject to any disclaimer, the term of this patent is extended or adjusted under 35 U.S.C. 154(b) by 1202 days.

(21) Appl. No.: 11/584,046

(22) Filed: Oct. 20, 2006

(65) Prior Publication Data

US 2007/0108194 A1   May 17, 2007

(30) Foreign Application Priority Data

Oct. 21, 2005  (DE) .................... 10 2005 050 528

(51) Int. Cl.
  *H05B 6/70* (2006.01)
  *H05B 6/64* (2006.01)
(52) U.S. Cl. .................. 219/697; 219/690; 428/220
(58) Field of Classification Search .............. 219/697, 219/690, 746, 700, 757, 691, 695, 745, 693, 219/750; 343/8, 10, 912, 915; 428/354, 428/516, 352, 220; 422/26
See application file for complete search history.

(56) References Cited

U.S. PATENT DOCUMENTS

| | | | |
|---|---|---|---|
| 4,320,275 A | 3/1982 | Reiss | |
| 6,833,537 B2 | 12/2004 | Risman et al. | |
| 6,906,297 B2 | 6/2005 | Tops | |
| 2003/0129128 A1* | 7/2003 | Strohmaier et al. | 423/716 |
| 2004/0080387 A1* | 4/2004 | Denis et al. | 333/252 |
| 2004/0104221 A1 | 6/2004 | Kono et al. | |
| 2006/0108360 A1 | 5/2006 | Feher et al. | |

FOREIGN PATENT DOCUMENTS

| | | |
|---|---|---|
| DE | 196 06 517 A1 | 8/1997 |
| DE | 199 29 666 C2 | 11/2001 |
| DE | 103 29 411 A1 | 2/2005 |
| EP | 02868187 A1 | 10/1988 |
| EP | 1 352 571 A1 | 9/2002 |
| JP | 01043950 A * | 2/1989 |
| WO | WO 87/07812 A | 12/1987 |
| WO | WO 94/20209 | 9/1994 |
| WO | WO 03/053105 | 6/2003 |

* cited by examiner

*Primary Examiner* — Quang T Van
(74) *Attorney, Agent, or Firm* — Thomas, Kayden, Horstemeyer & Risley, LLP

(57) ABSTRACT

An autoclave for pressure and temperature treatment of objects includes a pressure container having a pressure resistant wall which encloses a pressure chamber for receiving the objects to be treated, the pressure chamber having a free inner diameter of at least 1.5 m; and a heat source for heating the objects received in the pressure chamber, the heat source including a plurality of microwave sources irradiating microwave radiation, which are arranged outside the pressure container. The microwave sources are distributed over the pressure resistant wall at an areal density of at least 4 microwave sources per square meter surface area of the pressure resistant wall; and the microwave radiation irradiated by the microwave sources is coupled through the pressure resistant wall into the pressure chamber.

27 Claims, 4 Drawing Sheets

MICROWAVE AUTOCLAVE

CROSS REFERENCE TO RELATED APPLICATIONS

This application claims priority to co-pending German Patent Application No. DE 10 2005 050 528.7 entitled "Mikrowellenautoklav", filed Oct. 21, 2005.

FIELD OF THE INVENTION

The present invention relates to an autoclave for pressure and temperature treatment of objects. Particularly, the present invention relates to an autoclave for the manufacture of fiber compound parts.

There are various objects which are purposefully treated by pressure and temperature in an autoclave. These objects inter alia include foodstuffs which are sterilized in such an autoclave, and building materials, like for example lime sand bricks which are cured in an autoclave. In the following description it will be particularly referred to a further example of applying an autoclave, i. e. the manufacture of large size fiber compound parts made of fiber enforced plastics, like for example carbon fiber enforced or glass fiber enforced plastics. Such large size parts of fiber compound materials are for example manufactured in the aircraft industry as lightweight but nevertheless durable parts for aircrafts.

In detail, the present invention relates to an industrial autoclave having an outer diameter of at least 2 m, a free inner diameter of its pressure chamber of at least 1.5 m, and a length of several meters which is suited for the pressure and temperature treatment of such large scale objects.

BACKGROUND OF THE INVENTION

Known autoclaves which are presently used for the manufacture of fiber compound parts comprise a hot air source within the pressure container receiving the objects to be treated as the only heat source. A stream of hot air from the hot air source is directed through the pressure chamber to heat up its interior including the objects to be treated which are arranged therein. Often, air flow guiding sheets and air circulating ventilators are provided in the pressure chamber delimited by the pressure container for guiding this air stream. Heating the objects arranged in the pressure chamber by hot air is not without disadvantages. This heating only takes place via the surfaces of the objects over which the hot air flows and from which the heat energy has to get into the volume of the objects by means of heat conduction. Even the surfaces of the objects are not uniformly heated up by the hot air because, for example, of shadowing effects and other non-uniformities in the arrangement of the surfaces with regard to the hot air flow. Core areas of the objects having different distances to the surfaces of the objects are heated up with different rates, even if the surfaces of the objects are uniformly heated up. Further, the general efficiency in heat transfer onto the surfaces via convection is only low with the usual laminar air flows, as the flow velocity of the hot air goes down to zero in a boundary layer at the surfaces over which the air flows so that these boundary layers provide an unwanted thermal isolation layer about the respective object to be heated up. In addition, the hot air in the pressure chamber of the autoclave not only heats up the objects to be treated but also the autoclave itself. Even if the autoclave has a good internal isolation, much more than one half of the total heating power in a known hot air autoclave is not used for heating up the objects to be treated but for heating up the pressure container and the further contents of the pressure container like, for example, moulds for the object to be treated and their surrounding atmosphere.

A method and a microwave system for thermal processing shaped bodies of starting materials into three-dimensional composites of stable shape are known from DE 199 29 666 C2. Here, microwave radiation is coupled out of at least one microwave source via an associated coupling means into a processing chamber and directed onto an associated wave-optical mirror which reflects the microwave radiation into the processing volume and rearranges the amplitude distribution of the microwave radiation in such a way that a plane wave front is formed in the processing volume to provide for homogenous or at least sufficiently homogeneous field conditions. In this way, the thermal treatment of starting materials for the manufacture of fiber compound parts by means of microwave radiation shall be enabled in that inhomogenities of the temperature distribution over large size objects during their thermal treatment using microwave radiation are avoided. The method known from DE 199 29 666 C2 and the microwave system also described there are not yet applied in practice. One obstacle for the practical application is that suitable wave-optical mirrors are not available. Further, processing very large objects according to the known method using the known microwave system would require the application of very high power microwave sources. Further, even with ideally homogenous field conditions of the applied microwave radiation, a homogenous temperature distribution over the objects to be treated could not be ensured because of different absorptions, reflections and shadowing of the microwave radiation within the processing volume already by the objects to be treated. A simultaneous pressure treatment in addition to the temperature treatment is not provided by the method known form DE 199 29 666 C2 and the microwave system described therein.

An autoclave for pressure and temperature treatment of objects using microwave radiation as a heat source is known from WO 03/053105. Here, the pressure chamber is designed as a cavity resonator for the microwaves coupled-in from the outside of the pressure container. Thus, the diameter of the pressure chamber has to be exactly tuned to the frequency of the microwaves coupled-in. It may not have any desired value. The microwaves are coupled into the pressure chamber through the pressure resistant wall of the pressure container via two or three rows of microwave antennas which rows are evenly distributed in circumferential direction. Although it is generally intended to provide a plurality of microwave sources in bigger systems to limit the microwave power per microwave antenna, their actual number remains small, as they are to be also evenly distributed in axial direction. Further, the arrangement of the microwave sources also has to be adapted to the end of forming a single stationary wave in the pressure chamber. To form each individual microwave antenna, a body of dielectric material having a square cross section extends through the pressure resistant wall. Outside of the pressure container, a hollow wave guide having a square free cross section is attached to each of these microwave antennas. This construction has no stability in the range of higher pressures, as it is difficult to anchor the bodies of dielectric material in the pressure resistant wall in a pressure tight and pressure resistant way. Further, it does not seem to be realistic that a stationary microwave having nodes at the pressure resistant wall can be formed in the pressure chamber independently of the objects loaded into the pressure container having a fixed diameter. It does also not seem to be realistic that, upon constructing the pressure chamber as a cavity resonator for the microwave, a homogenous distribution of the microwave intensity over the pressure chamber is actually achieved.

Thus, a need remains for an autoclave for pressure and temperature treatment of objects, particularly in the manufacture of fibre compound parts, which allows for homogeneously heating up large scale objects arranged in the pressure chamber of the autoclave at a low input of energy.

SUMMARY OF THE INVENTION

The present invention relates to an autoclave for pressure and temperature treatment of objects comprising a pressure container having a pressure resistant wall which encloses a pressure chamber for receiving the objects to be treated, said pressure chamber having a free inner diameter of at least 1.5 m; and a heat source for heating the objects received in said pressure chamber, said heat source including a plurality of microwave sources irradiating microwave radiation, which are arranged outside said pressure container, said microwave sources being distributed over said pressure resistant wall at an areal density of at least 4 microwave sources per square meter surface area of said pressure resistant wall, and the microwave radiation irradiated by said microwave sources being coupled through said pressure resistant wall into said pressure chamber.

More particular the present invention relates an autoclave for pressure and temperature treatment of objects in the production of fiber compound parts, said autoclave comprising a pressure container having a pressure resistant wall which encloses a pressure chamber for receiving the objects to be treated, said pressure chamber having a free inner diameter of at least 1.5 m; and a heat source for heating the objects received in said pressure chamber, said heat source including a plurality of microwave sources irradiating microwave radiation, which are arranged outside said pressure container; and at least one hot air source for building up pressure in said pressure chamber by means of increasing a gas temperature of gas enclosed by said pressure container; said microwave sources being distributed over said pressure resistant wall at an areal density of at least 4 microwave sources per square meter surface area of said pressure resistant wall, and the microwave radiation irradiated by said microwave sources being coupled into a coaxial wave guide extending through said pressure resistant wall into said pressure chamber, an outer guiding element of said coaxial wave guide being a metal tube which is welded to said pressure resistant wall, which extends through an air guiding and microwave reflecting sheet arranged at a distance to said pressure resistant wall in the interior of said pressure container, and which is closed towards the pressure chamber by means of a pressure resistant, but microwave permeable cap.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
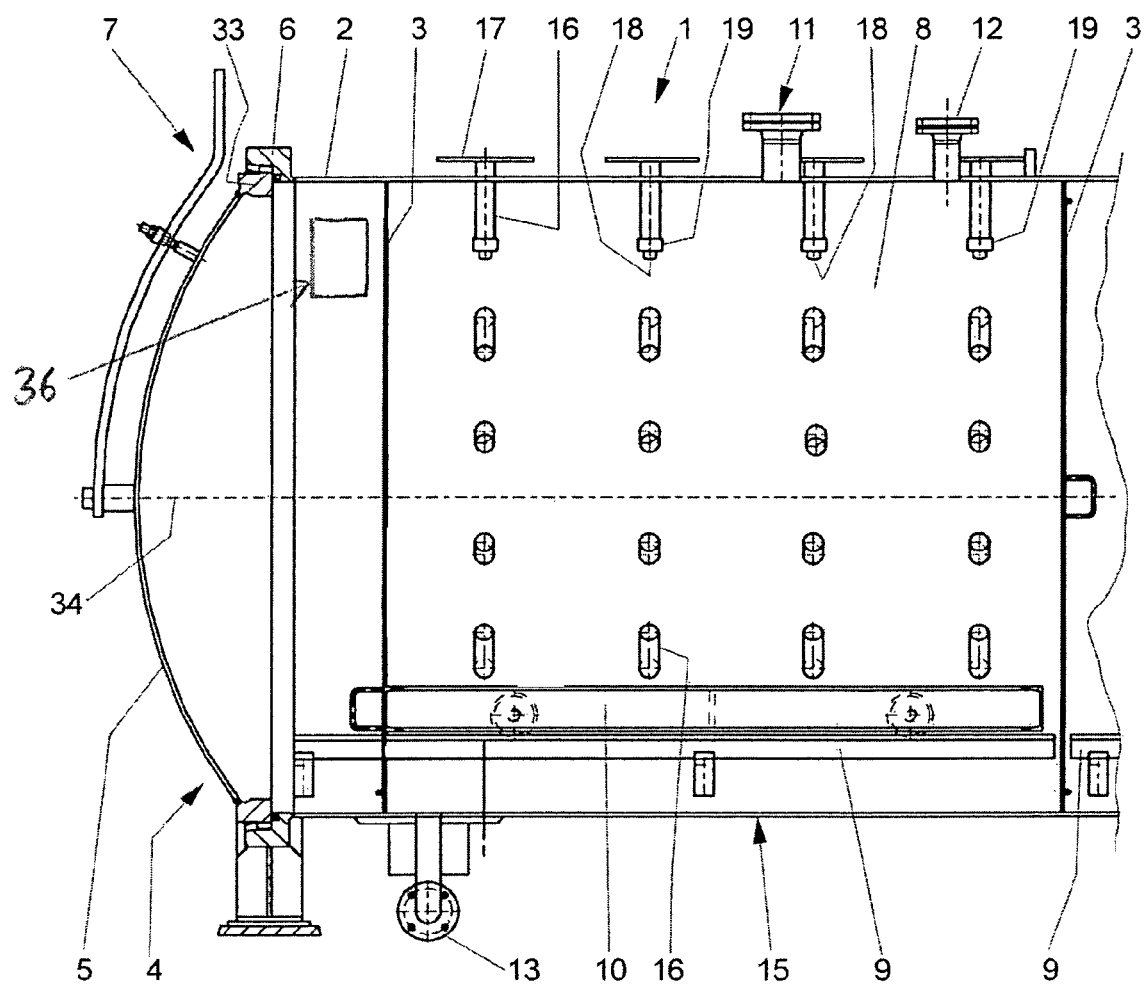
FIG. 1 shows a longitudinal section through the front segment of a microwave autoclave.

In the new autoclave the heat source for heating the objects arranged in the pressure chamber has a plurality of microwave sources. Because of this, the new autoclave is also designated as a microwave autoclave here. The new microwave autoclave combines the thermal treatment of objects using microwave radiation for heating the objects with a simultaneous pressure treatment of the objects. The microwave radiation irradiated by the microwave sources is coupled into the pressure chamber to act upon, i.e. to heat up the objects arranged in the pressure chamber.

In the new microwave autoclave at least four microwave source per square meter surface area of the pressure resistant wall are provided to achieve a homogeneous temperature distribution over the objects arranged in the pressure chamber. This figure is based on an industrial scale autoclave having an outer diameter of at least about 2 m and a free inner diameter of the pressure chamber of at least about 1.5 m as well as a length of several meters. With considerably smaller microwave autoclaves, the minimum number of microwave sources per square meter surface area of the pressure resistant wall would tend to be even higher. Anyway, it is preferred, if their number is at least 8 per square meter. Further, the microwave source are preferably evenly distributed over the surface area of the pressure resistant wall, except of a lower portion of the microwave autoclave in which a load carriage for loading the objects to be treated into the pressure chamber would block the microwave radiation anyway. Forming a single stationary microwave within the pressure chamber is no end in the new microwave autoclave. Instead, any intended distribution of the microwave intensity distribution is achieved by superimposing the microwave radiations irradiated by the individual microwave sources.

As a plurality of microwave sources is uniformly distributed over the surface area of the pressure resistant wall of the pressure container, and as the pressure resistant wall of an autoclave usually has the shape of an cylinder envelope, a comparatively homogenous microwave field in the pressure chamber of the microwave autoclave results from a sufficiently high areal density of the microwave sources. For purposefully generating a defined other than uniform intensity distribution of the microwave radiation to, for example, subject particular objects or areas of objects in the pressure chamber to a higher microwave radiation intensity than others, which may even be necessary for achieving a final uniform temperature distribution over these objects, it is also possible, to couple microwave irradiation of higher or more concentrated intensity irradiated by single ones of the microwave sources into the pressure chamber. To this end, beam antennas, like for example so-called horn beamers may be used for coupling the microwave radiation of these microwave sources into the pressure chamber.

The heating power coupled into the pressure chamber of the new microwave autoclave per microwave source in form of microwave radiation is in the range of 1 kW, and thus at least 4, preferably at least 8 kW of heating power per square meter of the pressure resistant wall are coupled into the pressure chamber in the form of microwave radiation. The typical heating power per square meter of the pressure resistant wall in a known hot air autoclave, on the other hand, is about 20 kW. Even if the new microwave autoclave has an additional hot air source, it does not need these high amounts of power, when the objects arranged in the pressure chamber are raised to the same temperatures as in a hot air autoclave. This is due to the direct coupling of the heat energy into the objects located in the pressure chamber via the microwave radiation.

The multitude of single microwave sources in the new microwave autoclave allows for doing with microwave sources of low to medium power which are available as standard components, even it the heating power of the heating source is at least mainly provided by microwave radiation. The multitude of single microwave sources in the new microwave autoclave at the same times allows for achieving a uniform or a voluntary non-uniform intensity distribution of the microwaves in the pressure chamber by arranging the microwave sources correspondingly. The microwave sources of the heating source are arranged outside of the pressure chamber, i.e. at the outside of the pressure container, and the microwave radiation irradiated by the microwave sources is coupled through the pressure resistant wall into the pressure container to provide a plurality of microwave sources without reducing the pressure chamber of the new microwave autoclave with regard to its useable inner volume. This has the further advantage that the microwave sources themselves are neither subject to the pressure in the microwave autoclave nor to the increased temperature present in the pressure chamber. Thus it is possible to use common microwave sources which are available as electronic standard components.

Not only in this case of retro fitting an existing autoclave with microwave sources but also in embodiments of the new microwave autoclave, which are constructed from scratch, the heating source may also comprise a hot gas source or at least a circulating means for the gas in the pressure chamber of the microwave autoclave. Circulating the gas which can not be heated up by the microwave radiation itself and which is thus suitably heated up with another heating source results in a more uniform temperature increase of the objects arranged in the pressure chamber which are subject to the microwave radiation.

In general, the heat source of the new microwave autoclave may only have microwave sources. If the heat source, however, also has a hot gas source besides the microwave sources, building up pressure in the pressure chamber may take place via increasing the temperature of the gas enclosed by the pressure container by means of the hot gas source. This is much more effective than increasing the temperature of the gas in the pressure chamber by means of microwave radiation.

The microwave sources used in the new microwave autoclave are preferably electronic standard components available at low cost, like for example so-called magnetrons, which are available up to a microwave power of 30 kW.

Typical known microwave sources which are available as standard components irradiate microwaves at a frequency in the range of 30 MHz to 30 GHz; the most typical frequencies being 0.913, 2.45 and 5.8 GHz. In the present invention microwave sources irradiating microwaves at a frequency of 2.45 GHz are particularly preferred. According to the present state of the art, magnetrons having this output frequency provide a maximum microwave power as compared to the cost of the microwave source, and a maximum efficiency with regard to coupling these microwaves into the matrix of fibre compound materials.

Microwave guides which extend through the pressure resistant wall can be used for coupling the microwave radiation through the pressure resistant wall into the pressure chamber of the new microwave autoclave. The microwave radiation is coupled into the microwave guide at that end of the respective microwave guide which is arranged at the outside of the pressure container, and emerges into the pressure chamber at the other end of the microwave guide located within the pressure chamber. Suitable microwave guides can be made as hollow conductors. However, coaxial guides the inner guiding element of which is a microwave antenna which is surrounded by a tube extending through the pressure resistant wall of the pressure container are particularly preferred as microwave guides in the new microwave autoclave. This tube provides the outer guiding element of the coaxial guide. If the tube is closed by a pressure resistant, but microwave permeable cap at its end within the pressure chamber, the whole microwave antenna is outside of the pressure chamber of the microwave autoclave. A cap suitable for a pressure resistant, but microwave permeable closure of the tube can, for example, be made of alumina, silica glass or calcium carbonate, which also display good temperature stability with regard to all of their properties relevant here. If the temperature stress is not very high, other materials like PTFE, PEEK or PEP can be used for the pressure resistant cap, which are less impact sensitive than the materials mentioned before. Alternatively, an also microwave permeable, but impact resistant protective cover, like for example of the plastic materials mentioned previously, may be used on top of the cap of the impact sensitive but temperature resistant material to protect it against a direct impact of objects which are for example pushed through the pressure chamber of the new microwave autoclave on a loading carriage. Preferably, a separate pressure seal is arranged between the pressure-tight cap and the tube. Further, the cap may be secured to the free end of the tube by means of a sleeve nut.

In a particularly preferred embodiment of the new microwave autoclave, the microwave guides coupling the microwave radiation into the pressure chamber are extending through air guiding and/or microwave reflecting sheets arranged at a distance to the inner circumference of the pressure container. These sheets may have the shape of a cylinder envelope or of cylinder envelope segments running in parallel to the pressure resistant wall. However, it is also possible to use plane or otherwise shaped air guiding and microwave reflecting sheets, if this, for example, helps in increasing the homogeneity of the microwave distribution in the pressure chamber by means of the parts of the microwave radiation reflected by the sheets. Further, a backflow of gas which is directed through the pressure chamber to homogenize the temperature distribution in the pressure chamber can take place behind these sheets. If the microwave radiation is reflected by the sheets and if, thus, only small parts of the microwave radiation hit the inner side of the pressure resistant wall, a thermal isolation arranged at the inner side of the pressure resistant wall will only to a small extent unnecessarily be heated up by the microwave radiation. Nevertheless, a thermal isolation at the inner side of the pressure resistant wall is generally useful in the new microwave autoclave.

The air guiding and/or microwave reflecting sheets may be directly supported at tubes receiving the microwave antennas for coupling the microwave radiation into the pressure chamber of the microwave autoclave so that these tubes have a multiple function.

The pressure chamber in the pressure container of the new microwave autoclave can be subdivided into separate microwave zones by means of gas permeable electromagnetic shields. Such electromagnetic shields do not allow for microwave radiation passing from one of the separated microwave zones into a neighbouring microwave zone. The gas permeability of the shields, however, allows for an air flow through the microwave autoclave over the entire length of the microwave autoclave, which is, for example, useful for cooling down the objects arranged in the pressure chamber after finalising their thermal treatment.

Due to the typical construction of the pressure resistant wall of the pressure container of an autoclave of metal, the new microwave autoclave has a metal envelope of good electric conductivity which inhibits any leakage of microwave radiation out of its pressure container.

The effects of the microwave radiation within the pressure chamber of the new microwave autoclave can for example be observed by means of a heat imaging camera or by means of a pyrometer or even by means of individual local heat sensors. The results of this observations can be used for optimizing the temperature distribution in that, for example, single microwave sources are purposefully switched on or off, or adjusted with regard to their output power.

It is to be understood that the objects which are to be placed in the new microwave autoclave have to be checked for whether they are suited for being subjected to microwave radiation. If this is not the case, the composition of the objects has to be altered, or the objects have to be protected against direct microwave radiation. Generally, and not only in the new microwave autoclave, it is preferred that moulds and other tools which are used in the autoclave have a low heat capacity to reduce the heat losses in the autoclave.

Microwave reflecting tools can be used, if, for example, the microwaves get to the object arranged on the tool through a microwave permeable vacuum bag. Especially with higher filling levels of the pressure chamber of the new microwave autoclave, however, the use of completely microwave transparent tools is preferred. Completely microwave transparent tools also allows for reaching an object with the microwave radiation which is completely enclosed in a moulding tool. By purposefully making tools with constant or neutral dielectric properties, the danger of locally overheating the objects with the microwave radiation is avoided.

A thermal isolation of the respective object on its tool to reduce the thermal losses out of the object is also possible. For heating up objects made of materials which only badly couple to microwave radiation, tools may be made of materials which in turn very well couple to microwave radiation so that the respective object is indirectly heated up by its tool.

Measuring techniques for determine the temperature of objects in the pressure chamber of the new microwave autoclave which can be used in a microwave surrounding include encased thermo elements, fibre optical thermo elements, light wave guides for local temperature measurements, thermo cameras, thermo scanners and pyrometers. The optical measurement techniques may comprise sensors outside of the microwave field, i.e. outside of the pressure container. It is sufficient, if an optical measurement device is able to survey the object from the outside of the pressure container through a window provided in the pressure resistant wall, for example. Any directly measuring elements however, have to be located at the respective object itself, and they have to be protected against the microwave radiation by shielded lines, if necessary.

In all processes in which lines are fed to the respective object like, for example, injection lines and vacuum lines, at least the injection lines have to be made of microwave reflecting materials. The resin in the injection lines has to be protected against direct exposure to microwaves radiation to avoid an undesired heating and a resulting curing of the resin at the wrong time. Vacuum lines have also to be made of microwave reflecting materials for security reasons to avoid an unnecessary formation of plasmas in the vacuum lines. This, however, is not imperative.

Figure 2:
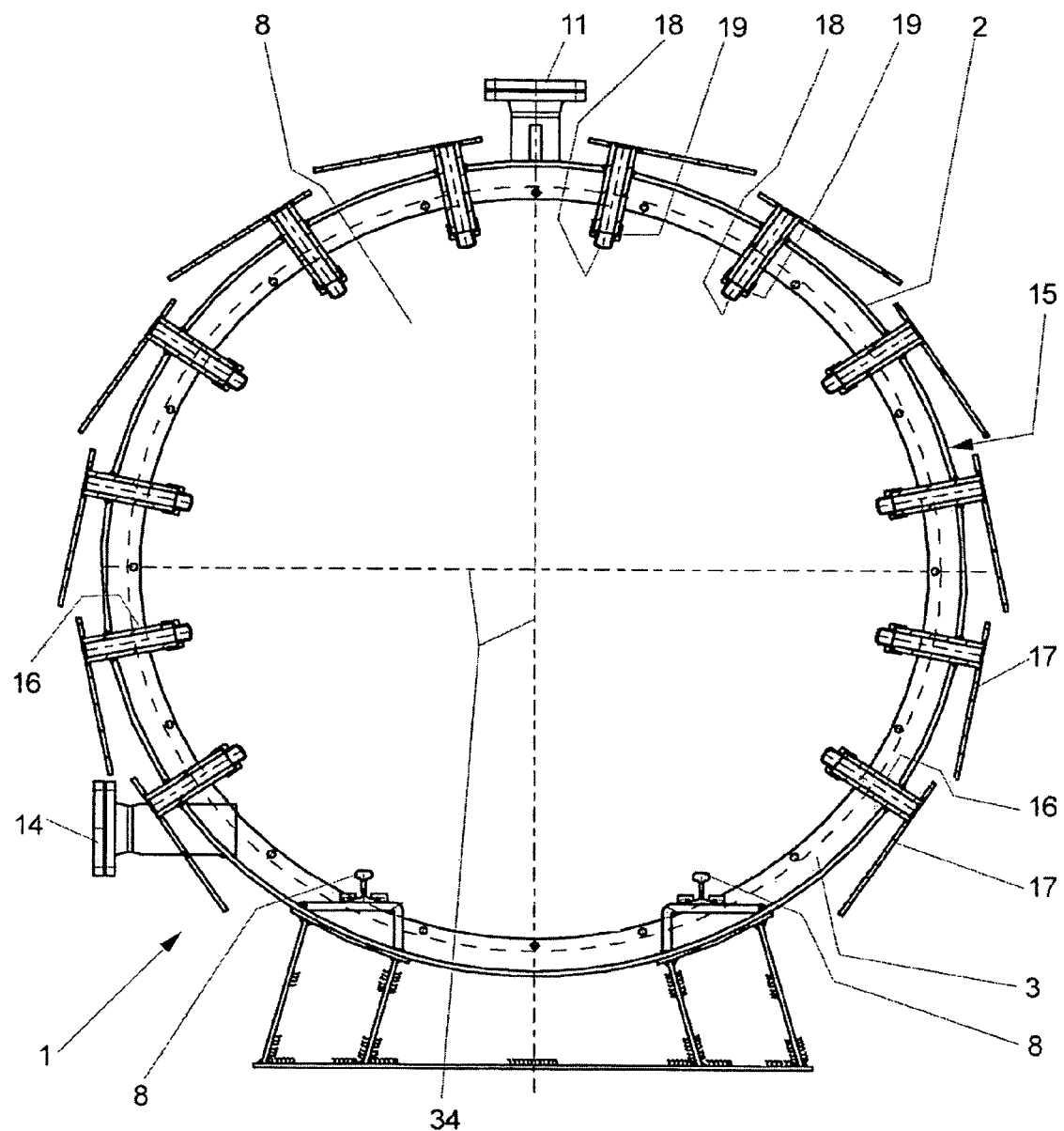
FIG. 2 shows a lateral cross section through the microwave autoclave according to FIG. 1.

Referring now in greater detail to the drawings, the microwave autoclave 1 depicted in FIG. 1 and FIG. 2 comprises a pressure container 15 having a pressure resistant wall 2. The pressure resistant wall 2 has the shape of a cylinder envelope. A pressure resistant lid 5 is provided at the end 4 of the microwave autoclave 1 depicted in FIG. 1. In an opened position, the lid 5 gives way to the entire cross section of the microwave autoclave 1 according to FIG. 2, as a container flange 6 only radically outwardly extends over the wall 2, to which it is fixed by welding. Lugs provided at a lid flange 33 of the lid 5 grip behind beads formed at the container flange 6 upon closing the lid 5 by means of rotating it about a longitudinal axis 34 of the pressure container 15. Thus a quick release closure is formed between the lid which may be swung open about a lid hinge 7 and the container flange. This quick release closure allows for a quick opening and access to a pressure chamber 8 enclosed by the pressure container 15, when the microwave autoclave 1 is depressurized. Rails 9 running at the bottom of the pressure chamber 8 are provided for a loading carriage 10. The loading carriage 10 is used for loading objects (not depicted here) which are to be pressure and temperature treated into the pressure chamber 8. The loading carriage 10 carrying the respective objects can be pushed into the pressure chamber 8 on the rails 9. Particularly, a plurality of loading carriers 10 can be introduced into the pressure chamber 8 one behind the other, as the pressure chamber 8 typically has a much bigger length than depicted in FIG. 1. For subdividing the pressure chamber 8 in the direction of the longitudinal axis 34 into single microwave zones, support flanges 3 are provided for electro-magnetic shields or the like which are not depicted here. Connectors 11 to 14 to the pressure container 15, which extend through the pressure resistant wall 2, are provided for various reasons. Particular applications of the connectors 11 to 14 and even of further connectors include passing supply lines to objects within the pressure chamber 8 like, for example, resin injection lines for the manufacture of fiber compound materials, or electric control and signaling lines, through the wall 2, or attaching heat imaging cameras and/or other measuring devices for observing the objects arranged within the pressure chamber 8. The pressure increase in the pressure chamber 8 of the microwave autoclave 1 is provided by increasing the temperature of the gas enclosed within the pressure container 15 by means of a hot gas source within the pressure chamber 8 which is only very schematically depicted here. Generally, the desired inside pressure within the pressure chamber 8 of the microwave autoclave is higher than 3 bar (0.3 MPa). A typical operation range is 6 to 7 bar (0.6 to 0.7 MPa) but can also exceed 10 bar (1 MPa). The microwave autoclave 1 is designed for a permanent load of up to 15 bar (1.5 MPa). The test pressure for the microwave autoclave 1 correspondingly is 22.5 bar (2.25 MPa). Besides the already mentioned hot gas source 36, a plurality of microwave sources is provided in the microwave autoclave 1 for heating the objects in the pressure chamber 8. In FIGS. 1 and 2, however, none of these microwave sources are depicted as such. In the FIGS. 1 and 2, only tubes 16 for receiving microwave antennas (also not depicted here) to couple microwave radiation from the microwave sources which are arranged at the outside of the pressure resistant wall 2 into the pressure chamber 8 are depicted. The tubes 16 made of metal perpendicularly extend through the wall 2, and they are welded to the wall 12 in a pressure-tight way. Mounting plates 17 to which the microwave sources (not depicted here) are mounted are welded to that ends of the tubes 16 located outside the pressure chamber 8. That ends of the tubes 16 extending into the pressure chamber 8 are closed by pressure resistant and pressure-tight, but microwave permeable caps 18 which are secured to the tubes 16 by sleeve nuts 19. This will be further explained with reference to the following figures. An overpressure within the pressure chamber 8 of the microwave autoclave 1 does thus not extend into the tubes 16 but is blocked from their interior by the caps 18. The plurality of the tubes 16 allows for coupling microwave radiation from a plurality of microwave sources into the pressure chamber 8. Because of the uniform distribution of the tubes 16 over the surface area of the pressure resistant wall 2 except of the lower area of the microwave autoclave 1 where the loading carrier 10 according to FIG. 1 would shield the pressure chamber 8 with regard to the microwave radiation anyway, either a uniform distribution of the microwave radiation or a purposeful concentration of the microwave radiation onto freely selectable areas of the pressure chamber 8 can be achieved in the pressure chamber 8. From that end of each tube 16 ending in the pressure chamber 8 microwave radiation which is coupled in at the other end of the respective tube spreads out into the pressure chamber 8 in the shape of a lobe. Superposition of such intensity distributions of a plurality of microwave sources, in which the intensity of each single microwave source can be controlled, allows for forming nearly any desired intensity distribution of the microwave radiation over the pressure chamber 8.

Figure 3:
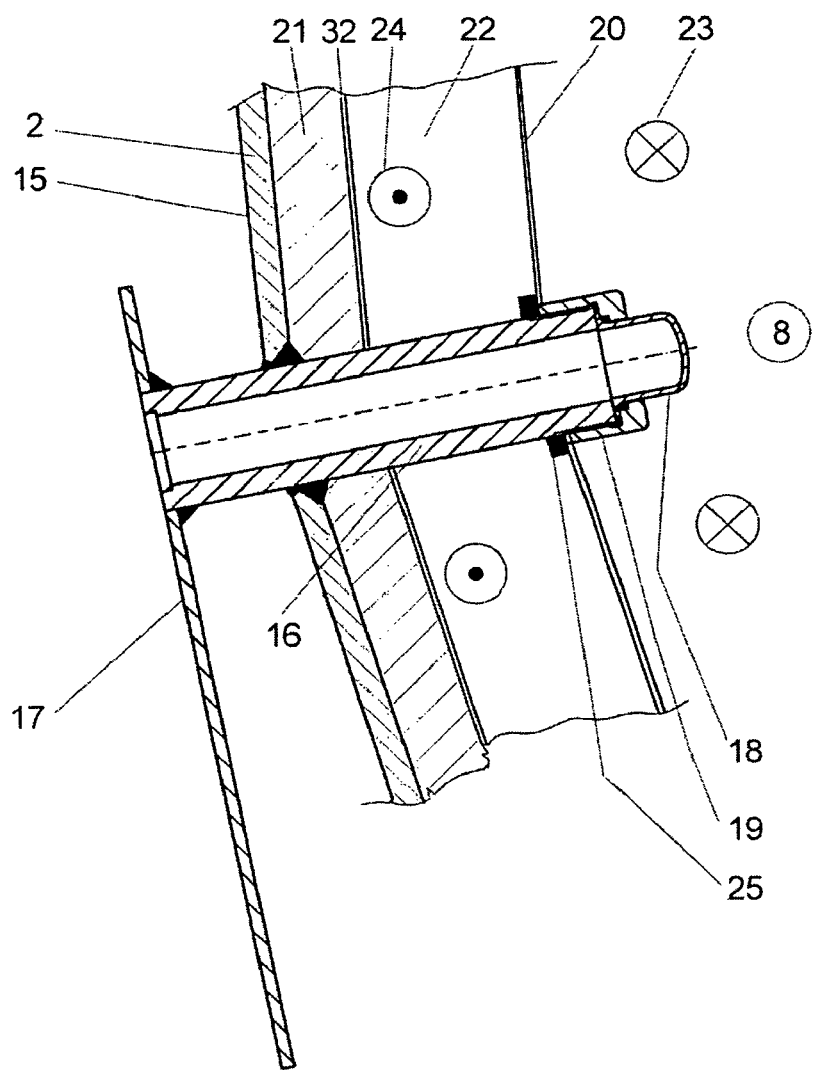
FIG. 3 shows a detail of the lateral cross section according to FIG. 2 depicting an additional air guiding and microwave reflecting sheet.

FIG. 3 shows an enlarged depiction of a tube 16 extending through the pressure resistant wall 2. At that end of the tube 16 which is located outside of the pressure container 15, the mounting plate 17 for the microwave source (also not depicted here) is attached. In addition to the details shown in the drawings according to FIGS. 1 and 2, FIG. 3 shows an air guiding and microwave reflecting sheet 20 and a thermal isolation 21. The isolation 21 is located at the inside of the wall 2 and provides a thermal isolation of the pressure chamber 8 in an outward direction. The isolation 21 terminates towards the pressure chamber 8 with an electrical isolation sheet 32. The air guiding and microwave reflecting sheet 20 delimits the part of the pressure chamber 8 in which the microwaves may spread. Further, the intensity distribution of the microwaves in the pressure chamber 8 is purposefully adjusted by means of the reflection of the microwaves at the sheet 20. Further, the sheet 20 separates a periphery from the remainder of the pressure chamber 8, which periphery serves as a backflow channel 22 for an air flow directed through the pressure chamber 8 and indicated by direction symbols 23 and 24. This circulating air flow is produced by a ventilator device within the pressure chamber 8, which is not depicted here and which is for example arranged at the end of the pressure container 15 opposite to the lid 5 according to FIG. 1. The sheet 20 is here attached to the tube 16 and clamped on the tube 16 between a collar 25 fixed to the tube 16 and the sleeve nut 19.

Figure 4:
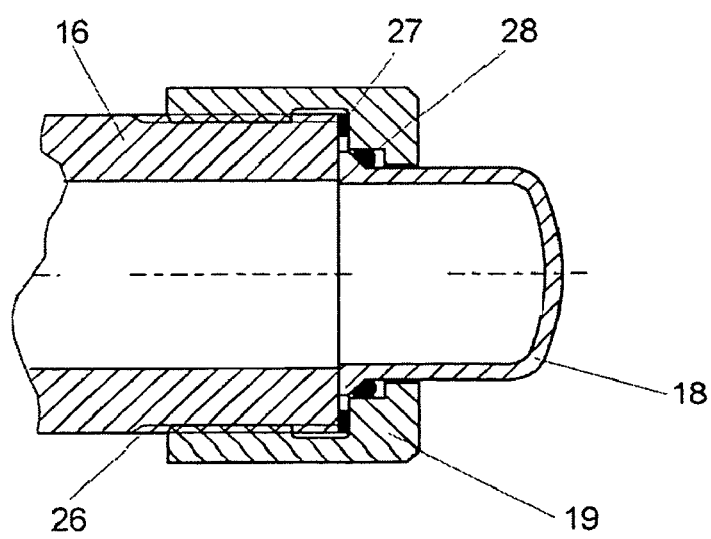
FIG. 4 shows an end of a tube of a coaxial wave guide for coupling microwave radiation into a pressure chamber of the microwave autoclave according to FIGS. 1 and 2.

FIG. 4 shows the attachment of the cap 18 on the end of the tube 16 which can receive a microwave antenna for coupling microwave radiation into the pressure chamber 8. Here, the collar 25 and the sheet 20 according to FIG. 3 are not depicted. The cap 18 is made of alumina which is perfectly pressure resistant at a temperature of about 180° C. for which the microwave autoclave 1 according to FIGS. 1 and 2 is typically provided, and even at higher temperatures up to 800° C. Other pressure and temperature resistant materials like, for example, silica glass and calcium carbonate can also be used, if they let the microwave radiation coupled into the tube 16 spread into the pressure chamber 8 like alumina. The cap 18 is held on the tube 16 by the sleeve nut 19, the sleeve nut 19 engaging an outer thread 26 cut into the tube 16. Two seals 27 and 28 are provided between the cap 18 and the sleeve nut 19, and between the sleeve nut 19 and the tube 16, respectively. Because of this sequence of the seals 27 and 28, the cap 18 can be supported rigidly and without air gap on the tube 16. The one seal 27 is pressed together between the sleeve nut 19 and the tube 16 in an axial direction, and the other seal 28 is pressed into a tapering gap between the cap 18 and the sleeve nut 19 by the pressure difference between the pressure chamber 8 and the interior of the tube 16.

Figure 5:
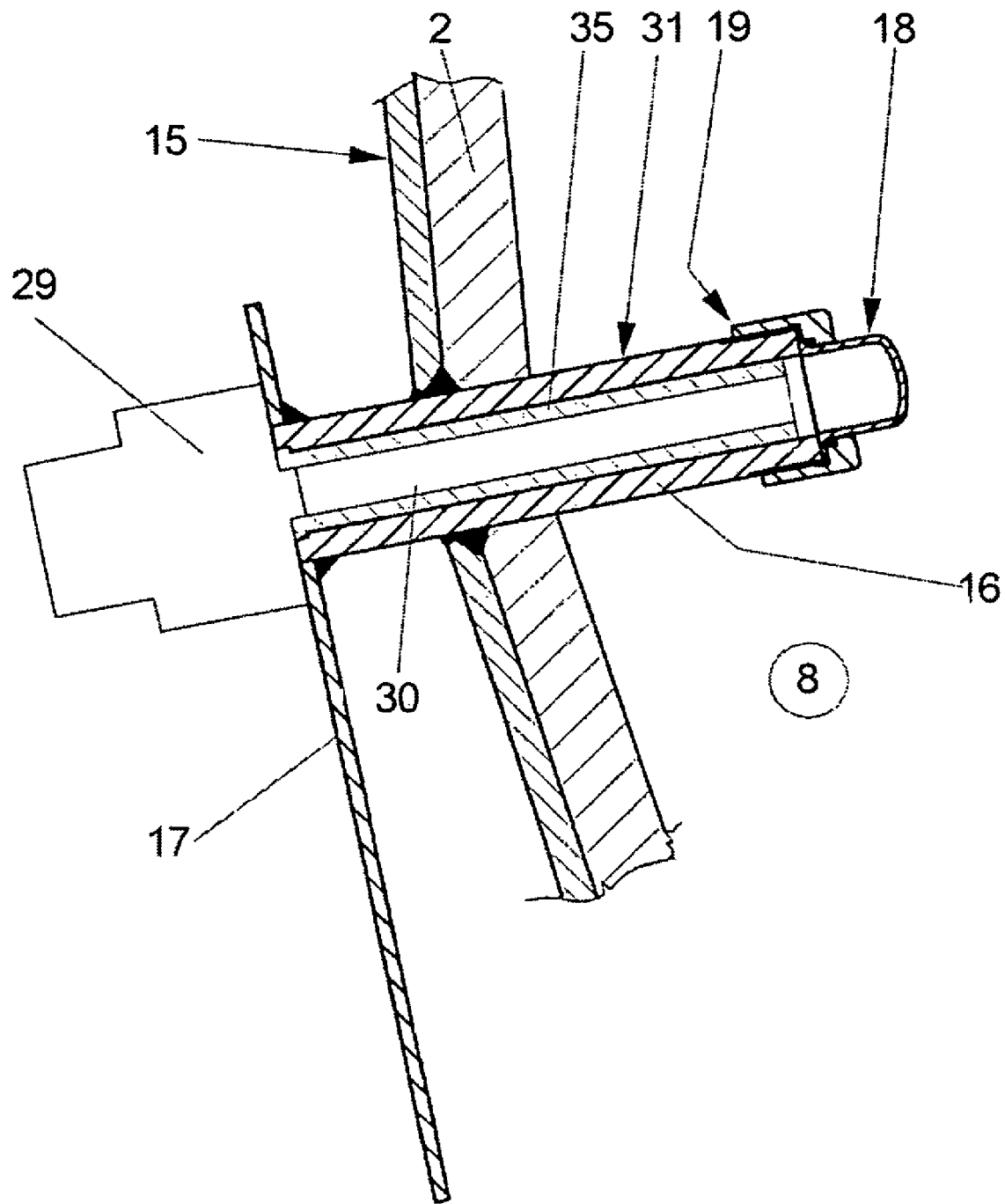
FIG. 5 shows a microwave source for coupling microwave radiation into the pressure chamber of the microwave autoclave via the tube, the end of which is depicted in FIG. 4.

FIG. 5 shows the arrangement of a microwave source 29 on one of the mounting plate 17. A microwave antenna 30 of the microwave source 29 constructed as a magnetron extends from the mounting plate 17 into the tube 16, and ends shortly in front of that end of the tube 16 located within the pressure chamber 8. Due to the coaxial arrangement of the microwave antenna in the tube 16 a coaxial conductor 31 is formed for the microwave radiation produced by the microwave source. A material with dielectric properties can be provided in a ring space 35 between the antenna 30 and the tube 16 for mechanically stabilizing the coaxial conductor 31. The microwave radiation guided by the coaxial conductor 31 through the wall 2 is irradiated through the cap 18 into the pressure chamber 3 of the microwave autoclave.

Many variations and modifications may be made to the preferred embodiments of the invention without departing substantially from the spirit and principles of the invention. All such modifications and variations are intended to be included herein within the scope of the present invention, as defined by the following claims.

We claim:

1. An autoclave for pressure and temperature treatment of objects comprising:
   a pressure container having a pressure resistant wall which encloses a pressure chamber for receiving the objects to be treated, said pressure chamber having a free inner diameter of at least 1.5 m; and
   a heat source for heating the objects received in said pressure chamber, said heat source including:
      a plurality of microwave sources irradiating microwave radiation, which are arranged outside said pressure container, the microwave radiation irradiated by said microwave sources being coupled through said pressure resistant wall into said pressure chamber, wherein the microwave radiation irradiated by each of said microwave sources arranged outside said pressure container is coupled into a coaxial wave guide extending through said pressure resistant wall, wherein said coaxial wave guide extends through an air guiding and microwave reflecting sheet arranged at a distance to said pressure resistant wall within said pressure chamber, and
      at least one hot air source for building up pressure in said pressure chamber by means of increasing a gas temperature of gas enclosed by said pressure container.

2. The autoclave of claim 1, wherein said microwave sources are distributed over said pressure resistant wall at an areal density of at least 4 microwave sources per square meter surface area of said pressure resistant wall.

3. The autoclave according to claim 2, wherein said microwave sources are evenly distributed over said pressure resistant wall at least in an upper half of a circumference of said pressure container.

4. The autoclave according to claim 1, wherein said heat source includes at least one microwave source being a magnetron.

5. The autoclave according to claim 1, wherein said heat source includes at least one microwave source which irradiates microwave radiation at a frequency selected from a range of 300 MHz to 30 GHz.

6. The autoclave according to claim 5, wherein said heat source includes at least one microwave source which irradiates microwave radiation at a frequency selected from a group of frequencies, the group of frequencies including 0.913, 2.45 and 5.8 GHz.

7. The autoclave of claim 1, wherein an outer guiding element of said coaxial wave guide is a metal tube extending through and anchored in said pressure resistant wall, said metal tube being closed towards the pressure chamber by means of a pressure resistant, but microwave permeable cap.

8. The autoclave of claim 7, wherein said metal tube is welded to said pressure resistant wall.

9. The autoclave of claim 7, wherein said cap is made of alumina, calcium carbonate or silica glass.

10. The autoclave of claim 7, wherein a protective cover made of microwave permeable, but impact resistant material is arranged over said pressure resistant cap.

11. The autoclave of claim 7, wherein said air guiding and microwave reflecting sheet is supported on said metal tube.

12. The autoclave of claim 1, wherein said pressure container is approved for a permanent pressure of 15 bar (1.5 MPa).

13. The autoclave of claim 1, wherein said pressure chamber in the interior of said pressure container is subdivided into individual microwave zones by means of air permeable, electro-magnetic shields.

14. An autoclave for pressure and temperature treatment of objects in the production of fiber compound parts, said autoclave comprising:
  a pressure container having a pressure resistant wall which encloses a pressure chamber for receiving the objects to be treated, said pressure chamber having a free inner diameter of at least 1.5 m ; and
  a heat source for heating the objects received in said pressure chamber, said heat source including:
    a plurality of microwave sources irradiating microwave radiation, which are arranged outside said pressure container; and
    at least one hot air source for building up pressure in said pressure chamber by means of increasing a gas temperature of gas enclosed by said pressure container;
    said microwave sources being distributed over said pressure resistant wall at an areal density of at least 4 microwave sources per square meter surface area of said pressure resistant wall, and
    the microwave radiation irradiated by said microwave sources being coupled into a coaxial wave guide extending through said pressure resistant wall into said pressure chamber, an outer guiding element of said coaxial wave guide being a metal tube which is welded to said pressure resistant wall,
      which extends through an air guiding and microwave reflecting sheet arranged at a distance to said pressure resistant wall in the interior of said pressure container, and
      which is closed towards the pressure chamber by means of a pressure resistant, but microwave permeable cap.

15. An autoclave for pressure and temperature treatment of objects comprising:
  a pressure container having a pressure resistant wall which encloses a pressure chamber for receiving the objects to be treated, said pressure chamber having a free inner diameter of at least 1.5 m; and
  a heat source for heating the objects received in said pressure chamber, said heat source including a plurality of microwave sources irradiating microwave radiation, which are arranged outside said pressure container,
    the microwave radiation irradiated by said microwave sources being coupled through said pressure resistant wall into said pressure chamber, in that the microwave radiation irradiated by each of said microwave sources arranged outside said pressure container is coupled into a coaxial wave guide extending through said pressure resistant wall;
  wherein an outer guiding element of said coaxial wave guide is a metal tube extending through and welded to said pressure resistant wall, said metal tube being closed towards the pressure chamber by means of a pressure resistant, but microwave permeable cap, and
  wherein said coaxial wave guide extends through an air guiding and microwave reflecting sheet arranged at a distance to said pressure resistant wall within said pressure chamber.

16. The autoclave of claim 15, wherein said microwave sources are distributed over said pressure resistant wall at an areal density of at least 4 microwave sources per square meter surface area of said pressure resistant wall.

17. The autoclave of claim 16, wherein said microwave sources are distributed over said pressure resistant wall at an areal density of at least 8 microwave sources per square meter surface area of said pressure resistant wall.

18. The autoclave according to claim 16, wherein said microwave sources are evenly distributed over said pressure resistant wall at least in an upper half of a circumference of said pressure container.

19. The autoclave according to claim 15, wherein said heat source further includes at least one hot air source for building up pressure in said pressure chamber by means of increasing a gas temperature of gas enclosed by said pressure container.

20. The autoclave according to claim 15, wherein said heat source includes at least one microwave source being a magnetron.

21. The autoclave according to claim 15, wherein said heat source includes at least one microwave source which irradiates microwave radiation at a frequency selected from a range of 300 MHz to 30 GHz.

22. The autoclave according to claim 21, wherein said heat source includes at least one microwave source which irradiates microwave radiation at a frequency selected from a group of frequencies, the group of frequencies including 0.913, 2.45 and 5.8 GHz.

23. The autoclave of claim 15, wherein said cap is made of alumina, calcium carbonate or silica glass.

24. The autoclave of claim 15, wherein a protective cover made of microwave permeable, but impact resistant material is arranged over said pressure resistant cap.

25. The autoclave of claim 15, wherein said air guiding and microwave reflecting sheet is supported on said metal tube.

26. The autoclave of claim 15, wherein said pressure container is approved for a permanent pressure of 15 bar (1.5 MPa).

27. The autoclave of claim 15, wherein said pressure chamber in the interior of said pressure container is subdivided into individual microwave zones by means of air permeable, electro-magnetic shields.

* * * * *